United States Patent [19]
Gleeson

[11] Patent Number: 5,975,132
[45] Date of Patent: Nov. 2, 1999

[54] PREASSEMBLED UNDERGROUND SECONDARY CONTAINMENT SYSTEM FOR CONTAINING FUEL

[75] Inventor: Bentley Francis Gleeson, Norristown, Pa.

[73] Assignee: Total Containment, Inc., Oaks, Pa.

[21] Appl. No.: 08/670,807

[22] Filed: Jun. 25, 1996

[51] Int. Cl.⁶ .................................................. B67D 5/60
[52] U.S. Cl. ......................... 137/571; 137/234.6; 141/86
[58] Field of Search ............................. 137/571, 234.6, 137/587, 363, 312; 141/98; 73/40.5; 220/86.1

[56] References Cited

U.S. PATENT DOCUMENTS

| | | |
|---|---|---|
| 1,622,030 | 3/1927 | Edwards . |
| 1,979,451 | 11/1934 | Clapp . |
| 2,004,074 | 6/1935 | Kiley . |
| 2,260,356 | 10/1941 | White . |
| 2,959,826 | 11/1960 | Larsen et al. . |
| 3,532,114 | 10/1970 | DeFrees . |
| 3,815,327 | 6/1974 | Viland . |
| 3,915,206 | 10/1975 | Fowler et al. . |
| 4,090,525 | 5/1978 | Potter . |
| 4,100,758 | 7/1978 | Mayer . |
| 4,166,485 | 9/1979 | Wokas . |
| 4,568,925 | 2/1986 | Butts . |
| 4,592,386 | 6/1986 | Mooney . |
| 4,615,362 | 10/1986 | Hartman et al. . |
| 4,685,327 | 8/1987 | Sharp . |
| 4,807,675 | 2/1989 | Sharp . |
| 4,884,709 | 12/1989 | McCarthy . |
| 4,951,844 | 8/1990 | Sharp . |
| 4,971,477 | 11/1990 | Webb et al. . |
| 4,988,020 | 1/1991 | Webb ................................. 141/88 X |
| 4,989,447 | 2/1991 | Gelin . |
| 5,018,558 | 5/1991 | Sharp . |
| 5,027,849 | 7/1991 | Diesener ............................. 137/236.1 |
| 5,038,838 | 8/1991 | Bergamini et al. . |
| 5,040,408 | 8/1991 | Webb ................................. 73/40.5 R |
| 5,060,509 | 10/1991 | Webb . |
| 5,088,530 | 2/1992 | Harp .......................................... 141/86 |
| 5,167,142 | 12/1992 | Sharp . |
| 5,217,052 | 6/1993 | Sharp . |
| 5,333,490 | 8/1994 | Webb .................................. 73/40.5 R |
| 5,390,713 | 2/1995 | Feich . |
| 5,526,964 | 6/1996 | Moore et al. . |
| 5,586,586 | 12/1996 | Fiech . |

FOREIGN PATENT DOCUMENTS

| | | |
|---|---|---|
| 681502 | 9/1939 | Germany . |
| 1118037 | 11/1961 | Germany . |

OTHER PUBLICATIONS

International Search Report for related International Application No. PCT/US97/10111, Oct., 1997.

*Primary Examiner*—John Rivell
*Attorney, Agent, or Firm*—Akin, Gump, Strauss, Hauer & Feld, L.L.P.

[57] ABSTRACT

An underground secondary containment system that is preassembled to a large extent at a manufacturing site prior to shipping to the site of installation. In this manner, the time expended at the site of installation in installing the underground secondary containment system is reduced. The underground secondary containment system includes a double walled fuel storage tank having isolated adjoining compartments for storing two different grades of fuel. A pair of dispenser sumps are mounted on the fuel storage tank at opposite ends thereof. A pair of tank sumps are mounted on the fuel storage tanks above the corresponding compartments. Each tank sump is connected to each of the dispenser sumps via flexible piping which extends along the exterior of the fuel storage tank. In this manner, two different grades of gasoline can be provided to each dispenser without utilizing piping disposed internally of the fuel storage tanks. The provision of separate tank sumps which are not located below above ground dispenser units permits ready access to the pump and associated fittings.

6 Claims, 4 Drawing Sheets

5,975,132

PREASSEMBLED UNDERGROUND SECONDARY CONTAINMENT SYSTEM FOR CONTAINING FUEL

FIELD OF THE INVENTION

The present invention relates to an underground secondary containment system, the primary purpose of which is to prevent the contained product, e.g., fuel, from contaminating the surrounding environment.

BACKGROUND OF THE INVENTION

Various devices have been utilized for containing fuel and other hazardous products to prevent the contamination of the surrounding environment. One such system is disclosed in U.S. Pat. No. 4,971,477. Another such device is disclosed in U.S. Pat. No. 5,390,713. This latter system, while attempting to reduce installation time, has several significant disadvantages. First, where multiple dispensers are serviced by a single multi-compartment underground storage tank, adjacent compartments are connected via internal piping, i.e., piping disposed on the interior of the storage tank and extending between the adjacent compartments. Due to variances in the fuel level of the adjacent compartments, the internal piping is subject to stress and hence breakage. This will lead to contamination of the higher grade gasoline. Also, this system utilizes only a single containment chamber for each above ground dispenser unit. Therefore, in pressure systems the pump is housed in the containment chamber under the dispenser unit. This makes access more difficult and further provides less area for servicing the pump.

OBJECTS AND SUMMARY OF THE INVENTION

An object of the present invention is to overcome the above mentioned deficiencies of the prior art. The present invention is directed to an underground secondary containment system that is preassembled to a large extent at a manufacturing site prior to shipping to the site of installation. In this manner, the time expended at the site of installation in installing the underground secondary containment system is reduced. The underground secondary containment system includes a double walled fuel storage tank having isolated adjoining compartments for storing two different grades of fuel. A pair of dispenser sumps are mounted on the fuel storage tank at opposite ends thereof. A pair of tank sumps are mounted on the fuel storage tanks above the corresponding compartments. Each tank sump is connected to each of the dispenser sumps via flexible piping which extends along the exterior of the fuel storage tank. In this manner, two different grades of gasoline can be provided to each dispenser without utilizing piping disposed internally of the fuel storage tanks. The provision of separate tank sumps which are not located below above ground dispenser units permits ready access to the pump and associated fittings.

DETAILED DESCRIPTION OF THE INVENTION

The preferred embodiment of the present invention will now be described hereinafter with reference made to the accompanying drawings.

FIGS. 1 to 4

Figure 1:
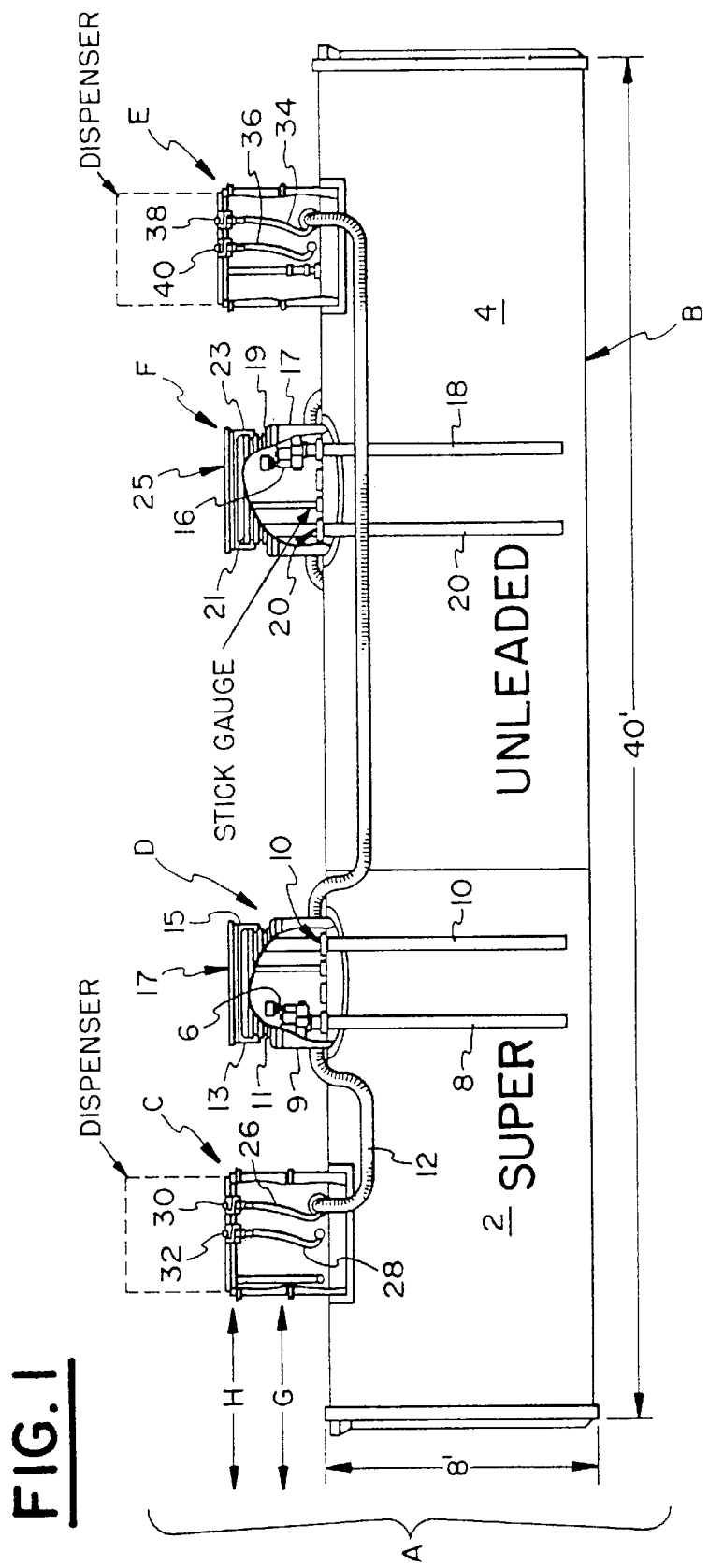
FIG. 1 is a fragmentary front elevational view of a preferred embodiment of the present invention.

Referring to FIG. 1, an underground secondary containment system A is depicted in the manner in which it is shipped from the factory after various components of the system have been integrity tested for leaks. The underground secondary containment system A includes a double walled storage tank B, a first dispenser sump C, a first tank sump D, a second dispenser sump E and a second tank sump F. The first and second dispenser sumps C and E, respectively, are each mounted directly below a conventional above ground dispenser unit. The above ground dispenser unit (shown in dotted lines in FIG. 1) is that item which is located typically on an island in a conventional gasoline station layout having a dispenser nozzle attached thereto through which a particular grade of gasoline is dispensed into the customer's automobile.

The term "dispenser sump" as used herein is defined as a containment chamber positioned directly beneath an above ground dispensing unit and which does not contain a pump for pumping the contents of the underground storage tank to an above ground dispenser. The term "tank sump" as used herein is defined as a containment chamber that houses a pump for pumping the contents of an underground storage tank to an above ground dispenser and collects leaking product from the pump, permits access for repair or servicing of the pump or the fitting therefor, and performs as a riser to keep excavation backfill away from the pump and the fittings therefor.

Preferably, the second or outer wall of the double wall storage tank B is made of high density polyethylene. Further, it is preferable that the dispenser sumps C and E, as well as the tank sumps D and F are formed from high density polyethylene. This material provides excellent strength, chemical resistance and soil burial stability. It is further easier to cut.

The double wall storage tank B includes first and second isolated adjoining compartments 2 and 4, respectively. The term "isolated adjoining compartments" as used herein is defined as at least two adjoining compartments of an underground fuel storage tank which do not have any internal piping (i.e., piping disposed on the interior of the fuel storage tank) which extends from one of the adjoining compartments to the other. The first compartment 2 is designated for the storage of super grade gasoline while the second compartment 4 is designated for regular unleaded grade gasoline. Because the double wall storage tank B of the present invention does not include any internal piping extending between the first compartment 2 and the second compartment 4, the two compartments are truly isolated and therefore, the possibility of contamination of the super grade with the unleaded grade due to internal pipe breakage is eliminated.

Tank sump D is mounted on (preferably by welding) the storage tank B above first compartment 2. The tank sump D houses a pump 6 which is connected to a dispensing pipe 8 extending into first compartment 2. The tank sump D also houses a fill pipe 10 which extends into compartment 2 and through which the first compartment is filled when empty. Preferably, the tank sump D includes a generally cylindrical sump base 9, a riser 11 and a removable cover 13 which allows access to the pump 6, its associated fittings and fill pipe 10. The riser 11 can be either a separate piece from the generally cylindrical base 9 or one-piece therewith. The riser section 11 of the tank sump D extends into a conventional manhole skirt 15 (See FIGS. 1 and 3). A conventional manhole cover 17 is seated in the manhole skirt 15. It is well known to mount tank sumps on underground storage tanks as shown by the disclosure of U.S. Pat. No. 5,040,408, the entire disclosure of which is incorporated herein by reference. However, as shown in the '408 patent, the manhole cover is positioned at grade level. In the present invention, the manhole cover 17 and removable cover 13 are positioned above grade represented by arrow G, see FIG. 1. The upper surface of the manhole cover 17 is in substantially the same horizontal plane as the upper surface of a conventional island disposed several inches above grade represented by arrow H. Positioning the manhole cover 17 and the removable cover 13 in this manner, significantly reduces the likelihood of surface run water from entering the tank sump D because its cover is positioned several inches above grade.

Although it is conventional to mount a tank sump on an underground fuel storage tank, it is not conventional to mount both a tank sump and a dispenser sump directly on a fuel storage tank. By providing two separate containment chambers, accessibility to the various components of the system is significantly increased. One example of this is the pump 6 which is separately housed in the tank sump removed from the above ground dispenser. The pump 6 can be readily accessed without going through the dispensing unit. Further, the separate tank sump provides a greater area for servicing the pump 6.

Figure 2:
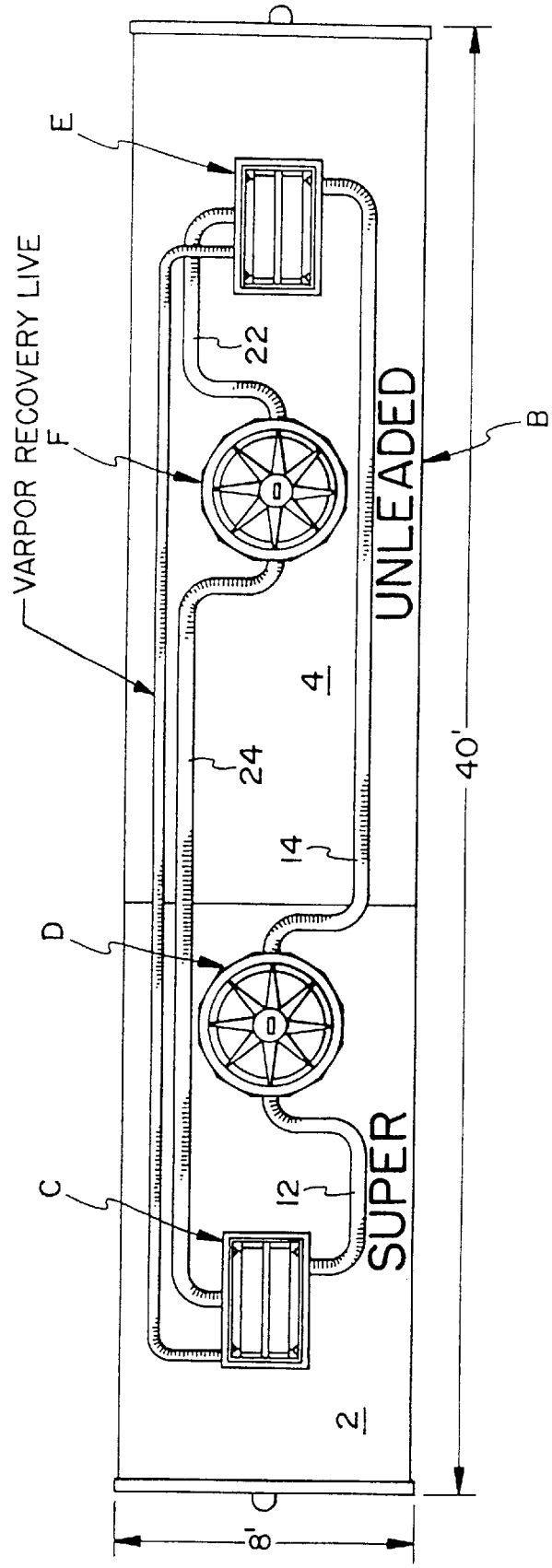
FIG. 2 is a plan view of the preferred embodiment of the present invention.

Two double wall piping runs 12 and 14 are connected to the pump 6 through conventional fittings, as seen in FIGS. 1 and 2. The piping run 12 extends through the sump base 9 to dispenser sump C. The piping 12 is connected to the tank sump base 9 and dispenser sump C by conventional bulkhead fittings. The piping run 14 extends through the opposite side of sump base 9 to the dispenser sump E, see FIG. 2. The piping 14 is connected to the tank sump base 9 and dispenser sump E by conventional bulkhead fittings. The piping runs 12 and 14 preferably are the Enviroflex® piping sold by the Total Containment, Inc. which includes a flexible fuel supply pipe and a flexible secondary containment pipe. The flexible supply pipe is removable from the secondary containment pipe and, thus, the primary pipe can be replaced without excavation. The Enviroflex® piping is described in U.S. Pat. No. 4,971,477 the entire disclosure of which is incorporated herein by reference.

Figure 3:
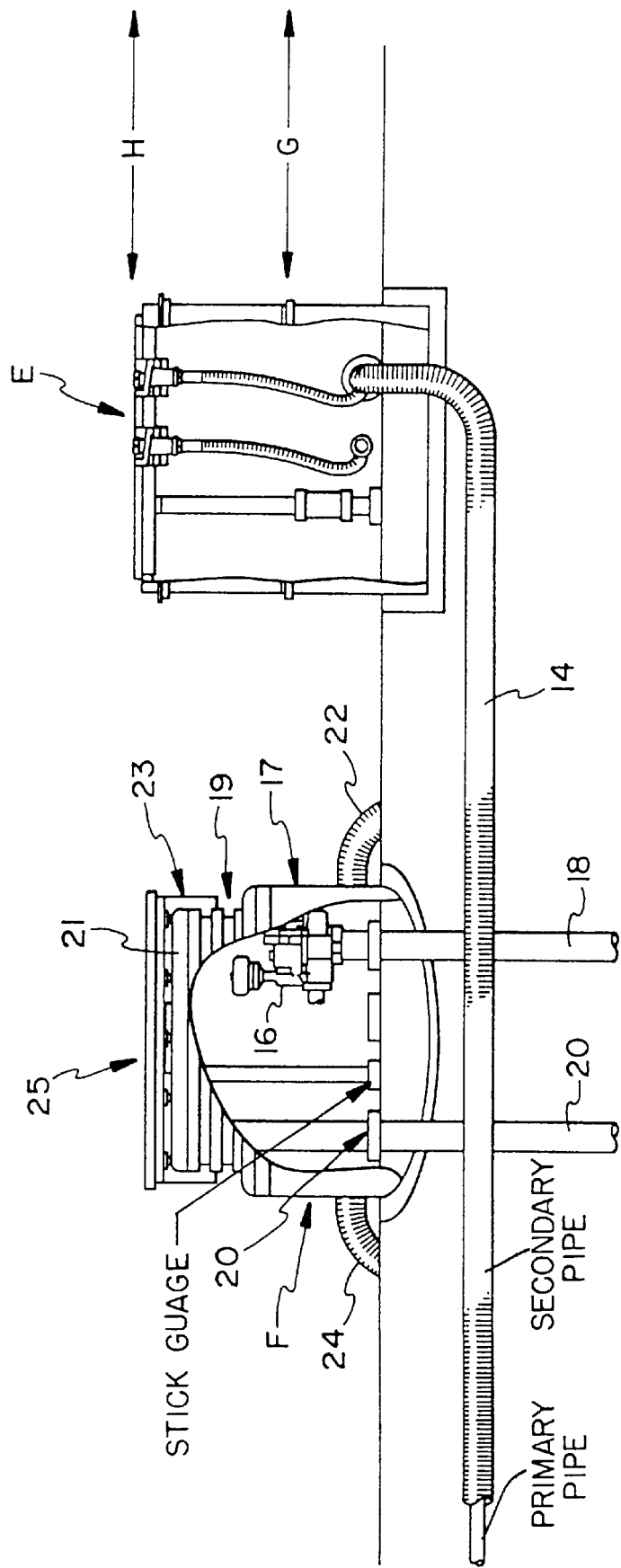
FIG. 3 is an enlarged fragmentary front elevational view of the preferred embodiment of the present invention.
Figure 4:
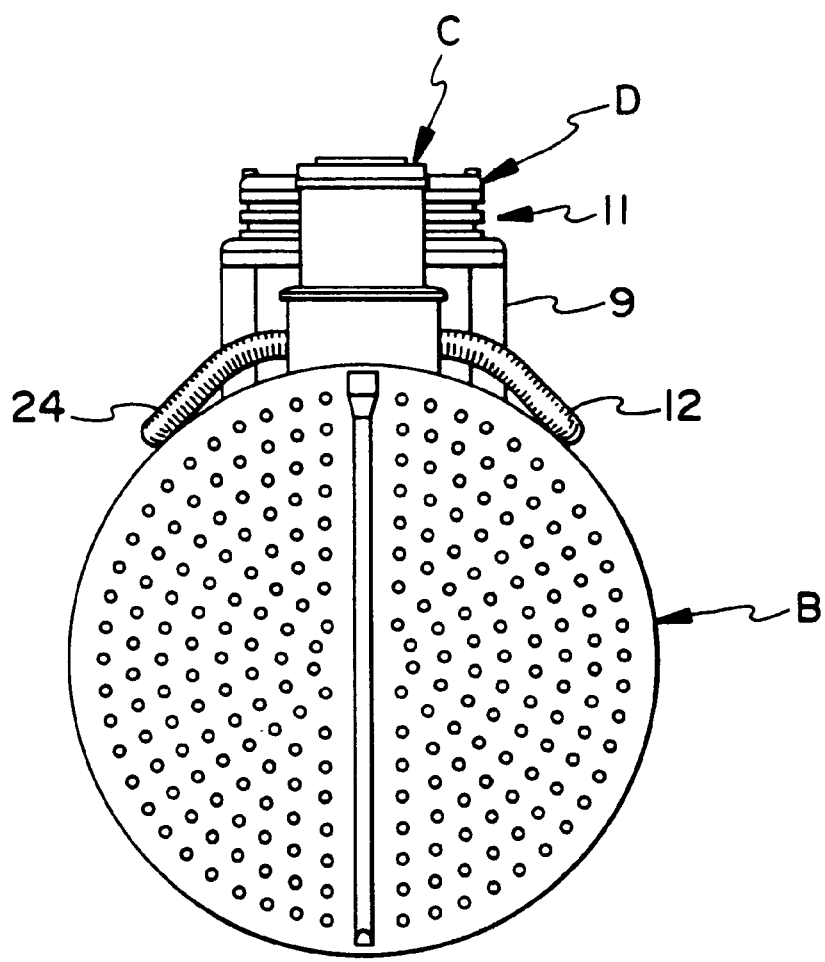
FIG. 4 is a side elevational view of the preferred embodiment of the present invention.

Tank sump F is mounted on (preferably by welding) the storage tank B above the second compartment 4. The tank sump F houses a pump 16 which is operably connected to dispensing pipe 18. As seen in FIG. 1, the dispensing pipe 18 extends into the second compartment 4 of the fuel storage tank B. The tank sump F further houses a fill pipe 20 which extends into the second compartment 4 and through which the compartment is filled when empty. The tank sump F is of similar construction to that of tank sump D. It includes a generally cylindrical sump base 17, a riser 19 and a removable cover 21. The riser 19 extends into the manhole skirt 23 having a conventional manhole cover 25. As seen in FIG. 3, the manhole cover 25 and the removable cover 23 are positioned above grade represented by arrow G and in substantially the same horizontal plane as the upper surface of a conventional island of a gasoline station represented by arrow H. It should be noted that manhole skirts 15 and 23 and the corresponding manhole covers can be shipped as shown in FIG. 1 which would require a strapping arrangement or can be shipped separately.

The pump 16 is connected to two piping runs 22 and 24 through conventional fittings, as seen in FIGS. 1 and 2. The piping run 22 extends between tank sump F and dispenser sump E while piping run 24 extends between tank sump F and dispenser sump C, as best seen in FIG. 2. The piping runs 22 and 24 are connected to the corresponding tank sumps and dispenser sumps by conventional bulkhead fittings. In this manner, unleaded fuel is supplied to each of the above ground dispenser units positioned directly above dispenser sumps C and E. Preferably, the piping runs 22 and 24 are the Enviroflex® piping.

The dispenser sump C is mounted on (preferably by welding) the storage tank B above first compartment 2. The dispenser sump C is positioned directly below and connected to an above ground dispenser. Flexible piping runs 26 and 28 connect the primary pipes of the super and unleaded grade, respectively to shear valves 30 and 32. The shear valves 30 and 32 are of conventional construction. The dispenser units include a known mixer for mixing the super and unleaded grade gasolines to achieve at least one intermediate grade of gasoline. Thus, the above ground dispenser is able to provide at least three separate grades.

Dispenser sump E is of similar construction to dispenser sump C. It is preferably welded to the polyethylene outer wall of fuel storage tank B above second compartment 4. The dispenser sump houses two flexible piping lines 34 and 36 which connect the flexible primary supply pipes of the super and unleaded grades, respectively to shear valves 38 and 40 which are of conventional construction. The dispenser sump E is mounted below an above ground dispenser which includes a known mixer for mixing the super and unleaded grades to achieve at least one intermediate grade. In this manner, the dispenser located above dispenser sump E is able to furnish at least three separate grades of gasoline.

The piping runs 12, 14, 22 and 24 are on the exterior of the underground storage tank B and hence accessible without need for accessing the interior thereof. Further, by placing the piping runs along the exterior of the underground storage tank B, they are not subject to the stresses internal piping extending between storage compartments 2 and 4 would encounter due to variances in the fuel levels of the first and second compartments.

The assembly illustrated in FIG. 1 is in the form as shipped from the manufacturing facility to the particular site for installation. Hence, the majority of assembly of the components is complete prior to shipping to the installation site. This reduces the installation time of conventional piping systems. It is also significant that assembly can now be done by the manufacturers of the components, i.e., the entity most familiar with the components. Further, because the piping runs are connected prior to shipping they can be integrity tested at the manufacturing site to ensure the integrity of both the primary and secondary pipes before shipment.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as may be applied to the central features hereinbefore set forth, and fall within the scope of the invention and the limits of the appended claims.

What is claimed is:

1. A preassembled underground secondary containment system for containing fuel which is deliverable to an installation site in a preassembled state for ease of installation, comprising:

an underground storage tank having at least first and second storage compartments for storing at least first and second grades of fuel;

a first dispenser sump and a first tank sump mounted on said underground storage tank adjacent said first compartment;

a second dispenser sump and a second tank sump mounted on said underground storage tank adjacent said second compartment;

a first section of secondarily contained flexible primary pipe preassembled with, extending between and connecting said first dispenser sump to said first tank sump, said first section of secondarily contained flexible primary pipe being disposed on the exterior of said underground fuel storage tank;

a second section of secondarily contained flexible primary pipe preassembled with, extending between and connecting said first dispenser sump to said second tank sump, said second section of secondarily contained flexible primary pipe being disposed on the exterior of said underground fuel storage tank, such that the first and second sections of secondarily contained flexible primary pipe are adapted to provide first and second grades of fuel to the first dispenser sump;

a third section of secondarily contained flexible primary pipe preassembled with, extending between and connecting said second dispenser sump and said first tank sump, said third section of said secondarily contained flexible primary pipe being disposed on the exterior of said underground fuel storage tank; and a fourth section of secondarily contained flexible primary pipe preassembled with, extending between and connecting said second dispenser sump and said second tank sump, said fourth section of said secondarily contained flexible primary pipe being disposed on the exterior of said underground fuel storage tank such that the third and fourth sections of secondarily contained flexible primary pipe are adapted to provide first and second grades of fuel to the second dispenser sump.

2. An underground secondary containment system as set forth in claim 1, wherein:

a) said first and second tank sumps include a base, a riser and a removable cover, each of said removable covers being positioned above grade for reducing the likelihood of surface run water entering said first and second tank sumps.

3. An underground secondary containment system as set forth in claim 2, wherein:

a) said first and second tank sumps are formed from polyethylene.

4. An underground secondary containment system as set forth in claim 1, wherein:

a) said first and second storage compartments are isolated adjoining compartments.

5. The underground secondary containment system of claim 1 wherein the first, second, third and fourth sections of secondarily flexible primary pipe are each located in a corresponding section of flexible secondary containment pipe to provide secondary containment.

6. The underground secondary containment system of claim 5 wherein the sections of flexible secondary containment pipe allow replacement of the flexible primary pipe without excavation.

* * * * *